United States Patent
Mousavi Iraei et al.

(10) Patent No.: US 12,475,945 B2
(45) Date of Patent: Nov. 18, 2025

(54) SPIKE BASED PROGRAMMING OF A MEMORY CELL TO RESET STATE

(71) Applicant: Intel Corporation, Santa Clara, CA (US)

(72) Inventors: Rouhollah Mousavi Iraei, Albuquerque, NM (US); Mini Goel, Milpitas, CA (US); Hemant P. Rao, Albuquerque, NM (US); Raymond Zeng, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 17/671,091

(22) Filed: Feb. 14, 2022

(65) Prior Publication Data
US 2023/0260573 A1 Aug. 17, 2023

(51) Int. Cl.
*G11C 11/56* (2006.01)
*G11C 8/06* (2006.01)

(52) U.S. Cl.
CPC ............ *G11C 11/5628* (2013.01); *G11C 8/06* (2013.01); *G11C 11/5642* (2013.01); *G11C 11/5678* (2013.01)

(58) Field of Classification Search
CPC ... G11C 11/5628; G11C 8/06; G11C 11/5642; G11C 11/5678; G11C 13/0026; G11C 2013/009; G11C 2213/71; G11C 2213/76; G11C 13/0028; G11C 13/0061; G11C 2013/0092; G11C 13/0004; G11C 13/0069
See application file for complete search history.

(56) References Cited

U.S. PATENT DOCUMENTS

| | | | |
|---|---|---|---|
| 9,312,004 B1* | 4/2016 | Cho | G11C 13/0002 |
| 2017/0076795 A1* | 3/2017 | Chen | G11C 13/0038 |
| 2019/0013071 A1* | 1/2019 | Srinivasan | G11C 13/0004 |
| 2022/0122658 A1* | 4/2022 | Lee | G11C 13/0028 |

OTHER PUBLICATIONS

U.S. Appl. No. 17/408,352, filed Aug. 20, 2021, entitled Encoding Additional States in a Three-Dimensional Crosspoint Memory Architecture (79 pages).
U.S. Appl. No. 17/540,884, filed Dec. 2, 2021 entitled Read Algorithms for Three-Dimensional Crosspoint Memory Architectures (58 page).

* cited by examiner

*Primary Examiner* — Jerome Leboeuf
(74) *Attorney, Agent, or Firm* — Alliance IP, LLC

(57) ABSTRACT

A memory device comprising a plurality of memory cells, a memory cell of the plurality of memory cells comprising a phase change material (PM) region and a select device (SD) region in series with the PM region; a first address line and a second address line coupled to the memory cell; and memory controller circuitry to interface with the first address line and the second address line, the memory controller circuitry to encode a state in the memory cell by applying, through the first address line and second address line, a current spike and a programming pulse to the memory cell to cause the PM region to be placed into an amorphous state and the SD region of the memory cell to be placed into a high threshold voltage state.

20 Claims, 8 Drawing Sheets

SPIKE BASED PROGRAMMING OF A MEMORY CELL TO RESET STATE

FIELD

The present disclosure relates in general to the field of computer development, and more specifically, to memory devices having memory cells programmable to a reset state.

BACKGROUND

A storage device may include non-volatile memory, such as multi-stack 3D crosspoint memory arrays. Memory cells of the memory arrays may be programmed via wordlines and bitlines of the memory array.

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
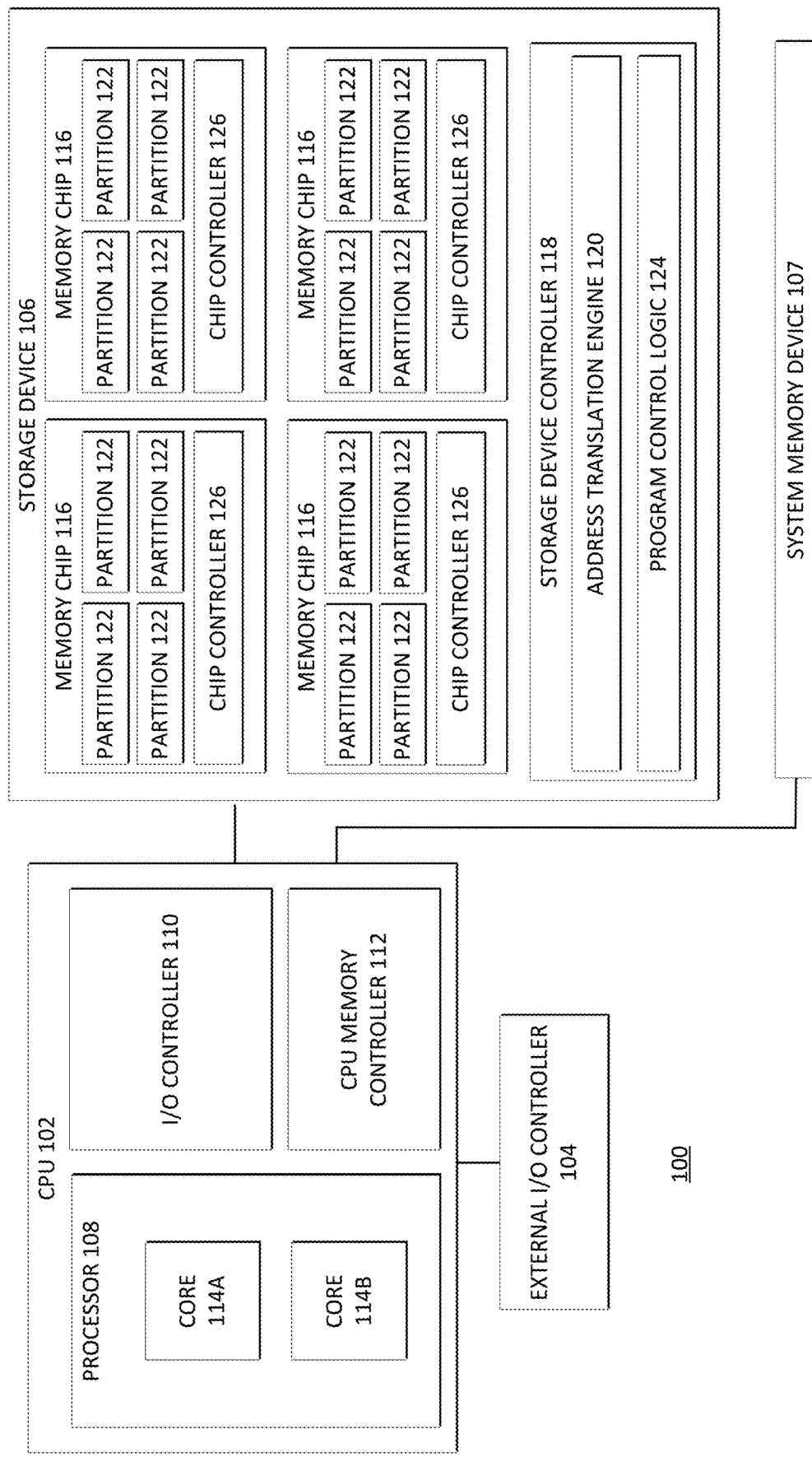
FIG. 1 illustrates components of a computer system in accordance with certain embodiments.

FIG. 1 illustrates components of a computer system 100 in accordance with certain embodiments. System 100 includes a central processing unit (CPU) 102 coupled to an external input/output (I/O) controller 104, a storage device 106 such as a solid state drive (SSD) or a dual inline memory module (DIMM), and system memory device 107. During operation, data may be transferred between a storage device 106 and/or system memory device 107 and the CPU 102. In various embodiments, particular memory access operations (e.g., read and write operations) involving a storage device 106 or system memory device 107 may be issued by an operating system and/or other software applications executed by processor 108. In various embodiments, a storage device 106 may include a storage device controller 118 and one or more memory chips 116 that each comprise any suitable number of memory partitions 122.

In various embodiments, a memory partition 122 may include a 3D crosspoint memory array. In some embodiments, a 3D crosspoint memory array may comprise a transistor-less (e.g., at least with respect to the data storage elements of the memory) stackable crosspoint architecture in which memory cells sit at the intersection of row address lines and column address lines arranged in a grid. In 3D crosspoint memory arrays, a memory cell's programmed state (e.g., '0' or '1' in a single-level cell or '00', '10', '01', or '11' in a multi-level cell) is stored in a cell's threshold voltage (also referred to herein or in the figures as VT or $V_T$) or other voltage of the cell that may be ascertained through any suitable read algorithm (although various portions of the text of this disclosure may refer specifically to threshold voltages, VT, or $V_T$; the teachings associated with such references may also apply to such other voltages in certain embodiments). In some embodiments, the threshold voltage of a programmed memory cell may be a function of the pulse width(s) and/or amplitude of one or more program pulses applied across the terminals of the cell during programming (also referred to herein as writing to the cell).

In some embodiments, a 3D crosspoint memory cell may store data as a function of the physical state of its phase change material (PM) region and select device (SD) region. In order to write a particular state (e.g., a reset (RST) state) into a memory cell, the PM region may be transitioned into an amorphous state and the SD region may be placed into a state exhibiting a high VT. To achieve this, a programming operation may utilize a large and relatively constant current applied for a period of time. However, use of a large current may result in a large amount of energy dissipation.

Various embodiments of the present disclosure provide spike based programming of a memory cell to a reset state. In order to reduce the energy dissipation as well as to shorten the programming operation, a spike occurring during selection of the cell may be utilized to partially program the cell, thus reducing the current that is then applied to the cell after the selection to complete the programming of the memory cell to the RST state. The large spike selection current may cause the PM region to begin a transition into an amorphous state. In various embodiments, precise control may be exercised on the selection spike current passing through the cell during the first 1-2 ns after the cell snaps back, selecting the cell to fully transition the PM region into the amorphous state and the entire MLC memory cell into the RST state. This current applied after the spike may have a relatively low amplitude, thus resulting in reduced energy expenditure. In some embodiments, transition of the PM region from a crystalline to an amorphous state may be achieved in 5 ns or less (compared to 10-20 ns in other write sequences), thus improving the programming speed significantly relative to other write sequences.

CPU 102 comprises a processor 108, such as a microprocessor, an embedded processor, a digital signal processor (DSP), a network processor, a handheld processor, an application processor, a co-processor, an SOC, or other device to execute code (e.g., software instructions). Processor 108, in the depicted embodiment, includes two processing elements (cores 114A and 114B in the depicted embodiment), which may include asymmetric processing elements or symmetric processing elements. However, a processor may include any number of processing elements that may be symmetric or asymmetric. CPU 102 may be referred to herein as a host computing device (though a host computing device may be any suitable computing device operable to issue memory access commands to a storage device 106).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 (e.g., 114A or 114B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices. In other embodiments, the I/O controller 110 may be on a different chip from the CPU 102. I/O devices may refer to any suitable devices capable of transferring data to and/or receiving data from an electronic system, such as CPU 102. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device. In a particular embodiment, an I/O device may comprise a storage device 106 coupled to the CPU 102 through I/O controller 110.

An I/O device may communicate with the I/O controller 110 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 110 and an associated I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller 110 may be located off-chip (e.g., not on the same chip as CPU 102) or may be integrated on the same chip as the CPU 102.

CPU memory controller 112 is an integrated memory controller that controls the flow of data going to and from one or more system memory devices 107. CPU memory controller 112 may include logic operable to read from a system memory device 107, write to a system memory device 107, or to request other operations from a system memory device 107. In various embodiments, CPU memory controller 112 may receive write requests from cores 114 and/or I/O controller 110 and may provide data specified in these requests to a system memory device 107 for storage therein. CPU memory controller 112 may also read data from a system memory device 107 and provide the read data to I/O controller 110 or a core 114. During operation, CPU memory controller 112 may issue commands including one or more addresses of the system memory device 107 in order to read data from or write data to memory (or to perform other operations). In some embodiments, CPU memory controller 112 may be implemented on the same chip as CPU 102, whereas in other embodiments, CPU memory controller 112 may be implemented on a different chip than that of CPU 102. I/O controller 110 may perform similar operations with respect to one or more storage devices 106.

The CPU 102 may also be coupled to one or more other I/O devices through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

A system memory device 107 may store any suitable data, such as data used by processor 108 to provide the functionality of computer system 100. For example, data associated with programs that are executed or files accessed by cores 114 may be stored in system memory device 107. Thus, a system memory device 107 may include a system memory that stores data and/or sequences of instructions that are executed or otherwise used by the cores 114. In various embodiments, a system memory device 107 may store temporary data, persistent data (e.g., a user's files or instruction sequences) that maintains its state even after power to the system memory device 107 is removed, or a combination thereof. A system memory device 107 may be dedicated to a particular CPU 102 or shared with other devices (e.g., one or more other processors or other devices) of computer system 100.

In various embodiments, a system memory device 107 may include a memory comprising any number of memory partitions, a memory device controller, and other supporting logic (not shown). A memory partition may include non-volatile memory and/or volatile memory.

Non-volatile memory is a storage medium that does not require power to maintain the state of data stored by the medium, thus non-volatile memory may have a determinate state even if power is interrupted to the device housing the memory. Nonlimiting examples of nonvolatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

A storage device 106 may store any suitable data, such as data used by processor 108 to provide functionality of computer system 100. For example, data associated with programs that are executed or files accessed by cores 114A and 114B may be stored in storage device 106. Thus, in some embodiments, a storage device 106 may store data and/or sequences of instructions that are executed or otherwise used by the cores 114A and 114B. In various embodiments, a storage device 106 may store persistent data (e.g., a user's files or software application code) that maintains its state even after power to the storage device 106 is removed. A storage device 106 may be dedicated to CPU 102 or shared with other devices (e.g., another CPU or other device) of computer system 100.

In the embodiment depicted, storage device 106 includes a storage device controller 118 and four memory chips 116 each comprising four memory partitions 122 operable to store data, however, a storage device may include any suitable number of memory chips each having any suitable number of memory partitions. A memory partition 122 includes a plurality of memory cells operable to store data. The cells of a memory partition 122 may be arranged in any suitable fashion, such as in rows (e.g., wordlines) and columns (e.g., bitlines), three dimensional structures, sectors, or in other ways. In various embodiments, the cells may be logically grouped into banks, blocks, subblocks, wordlines, pages, frames, bytes, slices, or other suitable groups. In various embodiments, a memory partition 122 may include any of the volatile or non-volatile memories listed above or other suitable memory. In a particular embodiment, each memory partition 122 comprises one or more 3D crosspoint memory arrays. 3D crosspoint arrays are described in more detail in connection with the following figures.

In various embodiments, storage device 106 may comprise a disk drive (e.g., a solid state drive); a memory card; a Universal Serial Bus (USB) drive; a Dual In-line Memory Module (DIMM), such as a Non-Volatile DIMM (NVDIMM); storage integrated within a device such as a smartphone, camera, or media player; or other suitable mass storage device.

In a particular embodiment, one or more memory chips 116 are embodied in a semiconductor package. In various embodiments, a semiconductor package may comprise a casing comprising one or more semiconductor chips (also referred to as dies). A package may also comprise contact pins or leads used to connect to external circuits. In various embodiments, a memory chip may include one or more memory partitions 122.

Accordingly, in some embodiments, storage device 106 may comprise a package that includes a plurality of chips that each include one or more memory partitions 122. However, a storage device 106 may include any suitable arrangement of one or more memory partitions and associated logic in any suitable physical arrangement. For example, memory partitions 122 may be embodied in one or more different physical mediums, such as a circuit board, semiconductor package, semiconductor chip, disk drive, other medium, or any combination thereof.

System memory device 107 and storage device 106 may comprise any suitable types of memory and are not limited to a particular speed, technology, or form factor of memory in various embodiments. For example, a storage device 106 may be a disk drive (such as a solid-state drive), a flash drive, memory integrated with a computing device (e.g., memory integrated on a circuit board of the computing device), a memory module (e.g., a dual in-line memory module) that may be inserted in a memory socket, or other type of storage device. Similarly, system memory 107 may have any suitable form factor. Moreover, computer system 100 may include multiple different types of storage devices.

System memory device 107 or storage device 106 may include any suitable interface to communicate with CPU memory controller 112 or I/O controller 110 using any suitable communication protocol such as a DDR-based protocol, PCI, PCIe, USB, SAS, SATA, FC, System Management Bus (SMBus), or other suitable protocol. In some embodiments, a system memory device 107 or storage device 106 may also include a communication interface to communicate with CPU memory controller 112 or I/O controller 110 in accordance with any suitable logical device interface specification such as NVMe, AHCI, or other suitable specification. In particular embodiments, system memory device 107 or storage device 106 may comprise multiple communication interfaces that each communicate using a separate protocol with CPU memory controller 112 and/or I/O controller 110.

Storage device controller 118 may include logic to receive requests from CPU 102 (e.g., via an interface that communicates with CPU memory controller 112 or I/O controller 110), cause the requests to be carried out with respect to the memory chips 116, and provide data associated with the requests to CPU 102 (e.g., via CPU memory controller 112 or I/O controller 110). Storage device controller 118 may also be operable to detect and/or correct errors encountered during memory operations via an error correction code (ECC engine). In various embodiments, controller 118 may also monitor various characteristics of the storage device 106 such as the temperature or voltage and report associated statistics to the CPU 102. Storage device controller 118 can be implemented on the same circuit board or device as the memory chips 116 or on a different circuit board or device. For example, in some environments, storage device controller 118 may be a centralized storage controller that manages memory operations for multiple different storage devices 106 of computer system 100.

In various embodiments, the storage device 106 also includes program control logic 124 which is operable to control the programming sequence performed when data is written to or read from a memory chip 116. In various embodiments, program control logic 124 may provide the various voltages (or information indicating which voltages should be provided) that are applied to memory cells during the programming and/or reading of data (or perform other operations associated with read or program operations), perform error correction, and perform other suitable functions.

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 described herein may be located on a memory chip 116. In various embodiments, reference herein to a "controller" may refer to any suitable control logic, such as storage device controller 118, chip controller 126, or a partition controller. In some embodiments, reference to a controller may contemplate logic distributed on multiple components, such as logic of a storage device controller 118, chip controller 126, and/or a partition controller.

In various embodiments, storage device controller 118 may receive a command from a host device (e.g., CPU 102), determine a target memory chip for the command, and communicate the command to a chip controller 126 of the target memory chip. In some embodiments, the storage device controller 118 may modify the command before sending the command to the chip controller 126.

The chip controller 126 may receive a command from the storage device controller 118 and determine a target memory partition 122 for the command. The chip controller 126 may then send the command to a controller of the determined memory partition 122. In various embodiments, the chip controller 126 may modify the command before sending the command to the controller of the partition 122.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (e.g., on-chip) or package or any of the elements of CPU 102 may be located off-chip or off-package. Similarly, the elements depicted in storage device 106 may be located on a single chip or on multiple chips. In various embodiments, a storage device 106 and a computing host (e.g., CPU 102) may be located on the same circuit board or on the same device and in other embodiments the storage device 106 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, and a Gunning transceiver logic (GTL) bus. In various embodiments, an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Figure 2:
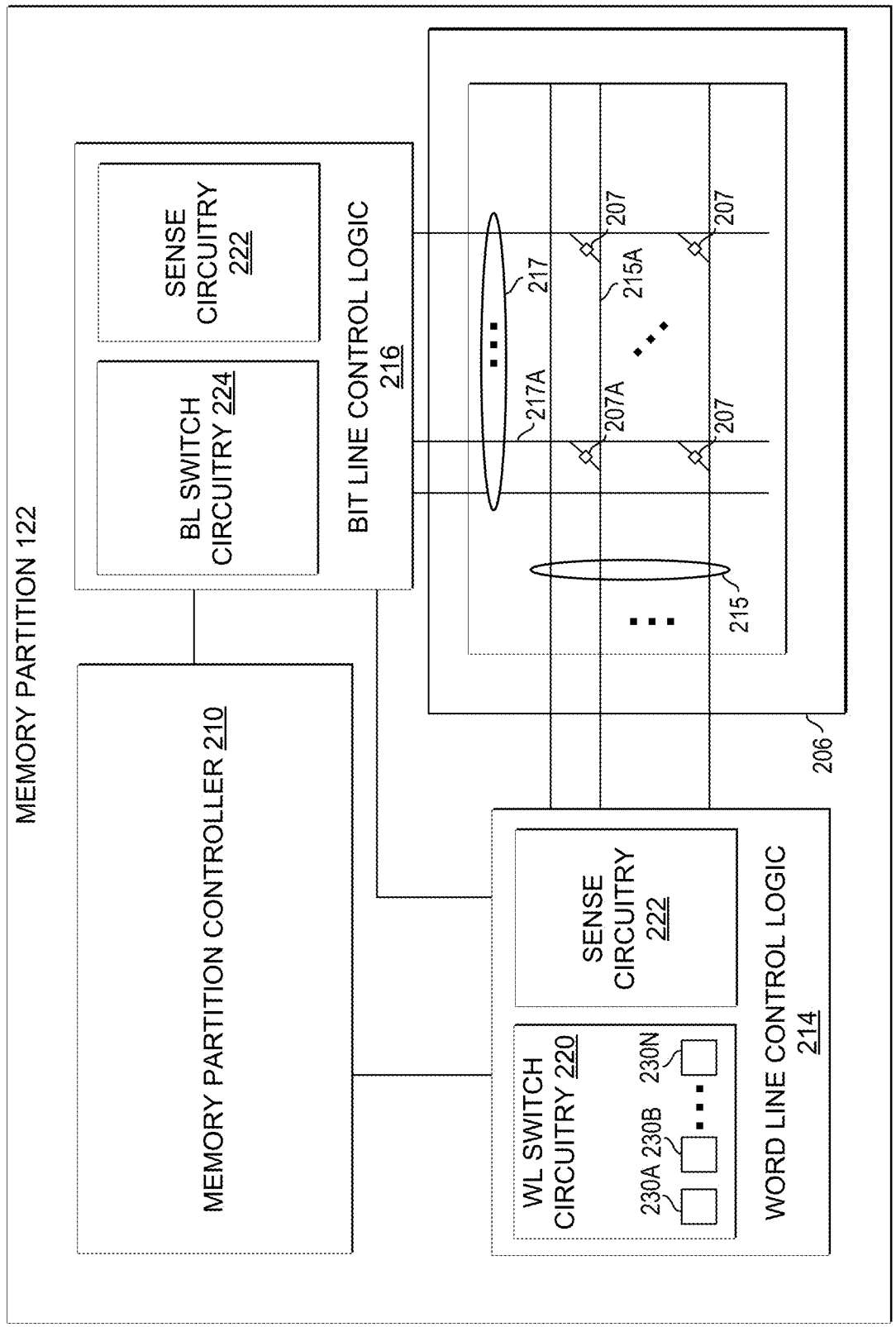
FIG. 2 illustrates a memory partition in accordance with certain embodiments.

FIG. 2 illustrates a detailed exemplary view of the memory partition 122 of FIG. 1 in accordance with certain embodiments. In one embodiment, a memory partition 122 may include 3D crosspoint memory which may include phase change memory or other suitable memory types. In some embodiments, a 3D crosspoint memory array 206 may comprise a transistor-less (e.g., at least with respect to the data storage elements of the memory) stackable crosspoint architecture in which memory cells 207 sit at the intersection of row address lines and column address lines arranged in a grid. The row address lines 215 and column address lines 217, called wordlines (WLs) and bitlines (BLs), respectively, cross in the formation of the grid and each memory cell 207 is coupled between a WL and a BL where the WL and BL cross (e.g., at a crosspoint). At the point of a crossing, the WL and BL may be located at different vertical planes such that the WL crosses over the BL but does not physically touch the BL. As described above, the architecture may be stackable, such that a wordline may cross over a bitline located beneath the wordline and another bitline for another memory cell located above the wordline. It should be noted that row and column are terms of convenience used to provide a qualitative description of the arrangement of WLs and BLs in crosspoint memory. In various embodiments, the cells of the 3D crosspoint memory array may be individually addressable. In some embodiments, bit storage may be based on a change in bulk resistance of a 3D crosspoint memory cell.

FIG. 2 illustrates a memory partition in accordance with certain embodiments. In the embodiment of FIG. 2, a memory partition 122 includes memory partition controller 210, wordline control logic 214, bitline control logic 216, and memory array 206. A host device (e.g., CPU 102) may provide read and/or write commands including memory address(es) and/or associated data to memory partition 122 (e.g., via storage device controller 118 and chip controller 126) and may receive read data from memory partition 122 (e.g., via the chip controller 126 and storage device controller 118). Similarly, storage device controller 118 may provide host-initiated read and write commands or device-initiated read and write commands including memory addresses to memory partition 122 (e.g., via chip controller 126). Memory partition controller 210 (in conjunction with wordline control logic 214 and bitline control logic 216) is configured to perform memory access operations, e.g., reading one or more target memory cells and/or writing to one or more target memory cells.

Memory array 206 corresponds to at least a portion of a 3D crosspoint memory (e.g., that may include phase change memory cells or other suitable memory cells) and includes a plurality of wordlines 215, a plurality of bitlines 217 and a plurality of memory cells, e.g., memory cells 207. Each memory cell is coupled between a wordline ("WL") and a bitline ("BL") at a crosspoint of the WL and the BL.

Memory partition controller 210 may manage communications with chip controller 126 and/or storage device controller 118. In a particular embodiment, memory partition controller 210 may analyze one or more signals received from another controller to determine whether a command sent via a bus is to be consumed by the memory partition 122. For example, controller 210 may analyze an address of the command and/or a value on an enable signal line to determine whether the command applies to the memory partition 122. Controller 210 may be configured to identify one or more target WLs and/or BLs associated with a received memory address (this memory address may be a separate address from the memory partition address that identifies the memory partition 122, although in some embodiments a portion of an address field of a command may identify the memory partition while another portion of the address field may identify one or more WLs and/or BLs). Memory partition controller 210 may be configured to manage operations of WL control logic 214 and BL control logic 216 based, at least in part, on WL and/or BL identifiers included in a received command. Memory partition controller 210 may include memory partition controller circuitry 211, and a memory controller interface 213. Memory controller interface 213, although shown as a single block in FIG. 2, may include a plurality of interfaces, for example a separate interface for each of the WL control logic 214 and the BL control logic 216.

WL control logic 214 includes WL switch circuitry 220 and sense circuitry 222. WL control logic 214 is configured to receive target WL address(es) from memory partition controller 210 and to select one or more WLs for reading and/or writing operations. For example, WL control logic 214 may be configured to select a target WL by coupling a WL select bias voltage to the target WL. WL control logic 214 may be configured to deselect a WL by decoupling the target WL from the WL select bias voltage and/or by coupling a WL deselect bias voltage (e.g., a neutral bias voltage) to the WL. WL control logic 214 may be coupled to a plurality of WLs 215 included in memory array 206. Each WL may be coupled to a number of memory cells corresponding to a number of BLs 217. WL switch circuitry 220 may include a plurality of switches, each switch configured to couple (or decouple) a respective WL, e.g., WL 215A, to a WL select bias voltage to select the respective WL 215A.

In some embodiments, switches of the WL switch circuitry 220 or other logic of the memory partition 122 may comprise spike mitigation devices 230 (e.g., 230A, 230B, . . . 230N). A spike mitigation device 230 may mitigate a current spike by limiting the amplitude of a current spike applied during a programming operation. In various embodiments, each spike mitigation device 230 may be coupled between the wordline control logic 214 and a respective wordline. In various embodiments, the spike mitigation device may comprise a transistor, such as an NMOS transistor or a PMOS transistor. In various embodiments, a WL select bias voltage or WL deselect bias voltage may be coupled to a wordline through the spike mitigation device 230 coupled to that wordline. In some embodiments, a gate of a transistor implementing a spike mitigation device 230 may be connected to driver logic of the wordline control logic 214 while the source or drain of the transistor may be connected to a wordline bias (e.g., WL select bias voltage, WL deselect bias voltage, intermediate bias, or other suitable bias voltage).

BL control logic 216 includes BL switch circuitry 224. In some embodiments, BL control logic 216 may also include sense circuitry, e.g., sense circuitry 222. BL control logic 216 is configured to select one or more BLs for reading and/or writing operations. BL control logic 216 may be configured to select a target BL by coupling a BL select bias voltage to the target BL. BL control logic 216 may be configured to deselect a BL by decoupling the target BL from the BL select bias voltage and/or by coupling a BL deselect bias voltage (e.g., a neutral bias voltage) to the BL. BL switch circuitry 224 is similar to WL switch circuitry 220 except BL switch circuitry 224 is configured to couple the BL select bias voltage to a target BL.

Sense circuitry 222 is configured to detect the state of one or more sensed memory cells 207 (e.g., via the presence or absence of a snap back event during a sense interval), e.g., during a read operation. Sense circuitry 222 is configured to provide a logic level output related to the result of the read operation to, e.g., memory partition controller 210.

As an example, in response to a signal from memory partition controller 210, WL control logic 214 and BL control logic 216 may be configured to select a target memory cell, e.g., memory cell 207A, for a read operation by coupling WL 215A to WL select bias voltage and BL 217A to BL select bias voltage as well as coupling the other WLs and BLs to respective deselect bias voltages. One or both of sense circuitries 222 may then be configured to monitor WL 215A and/or BL 217A for a sensing interval in order to determine the state of the memory cell 207A.

Thus, WL control logic 214 and/or BL control logic 216 may be configured to select a target memory cell for a read operation, initiate the read operation, sense the selected memory cell (e.g., for a snap back event) in a sensing interval, and provide the result of the sensing to, e.g., memory partition controller 210.

In a particular embodiment, the sense circuitry 222 may include a WL load connected to a WL electrode or gate, and a BL load connected to a BL electrode or gate. When a particular wordline and bitline are selected in the array, a difference between WL load or WL voltage and the BL voltage corresponds to a read VDM. VDM may induce a current (icell) in the memory cell 207A dependent on a program state of the memory cell. A comparator such as a sense amplifier may compare icell with a reference current in order to read a logic state of the memory cell. In this manner, an output of the sense amplifier/comparator may be indicative of a state of the target memory cell. A latch may be coupled to the output of the comparator to store the output of the read operation.

For each matrix of arrays, there may be a number of sense amplifiers provided, with the sense circuitry 222 able to process up to a maximum number of sensed bits, such as 128 bits, from the sense amplifiers at one time. Hence, in one embodiment, 128 memory cells may be sensed at one time by sense amplifiers of the sense circuitry 222.

Figure 3:
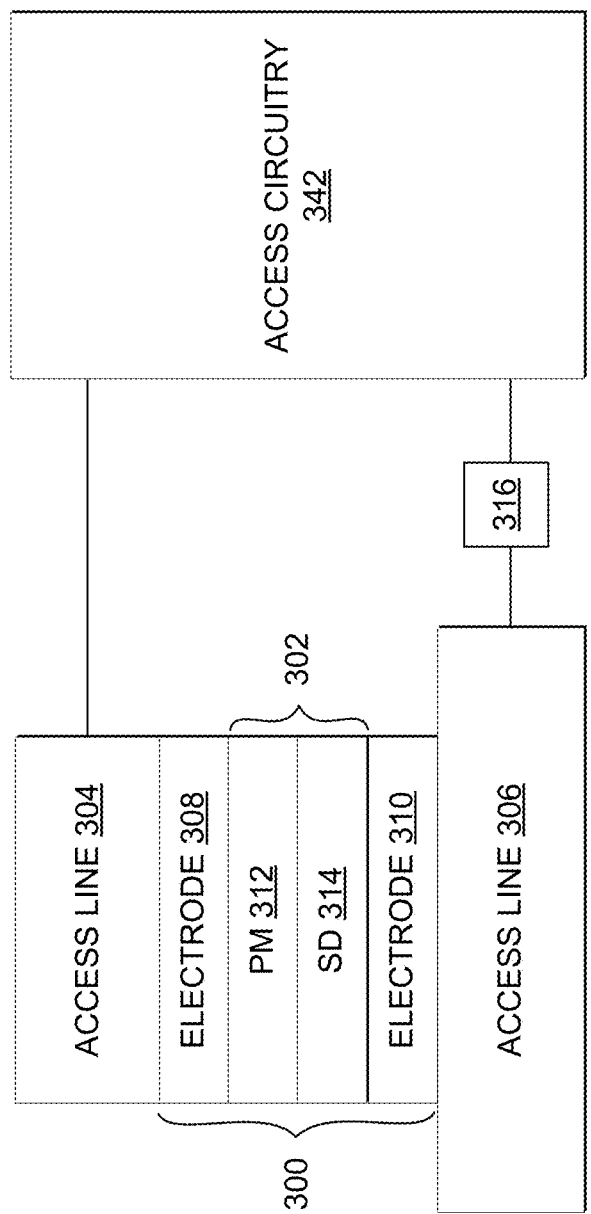
FIG. 3 illustrates a memory cell coupled to access circuitry in accordance with certain embodiments.

FIG. 3 illustrates a memory cell 300 coupled to access circuitry 342 in accordance with certain embodiments. The memory cell 300 includes a storage element 302 between access lines 304 and 306. In the embodiment depicted, the storage element 302 comprises a PM region 312 and an SD region 314. The access lines 304, 306 electrically couple the memory cell 300 with access circuitry 342 that writes to and reads the memory cell 300. For example, access circuitry 342 may include WL switch circuitry 220, BL switch circuitry 224, sense circuitry 222, or other suitable circuitry. The access circuitry 342 may be coupled to an access line 306 via a spike mitigation device 316 (e.g., which may have any suitable characteristics of spike mitigation device 230).

Access circuitry 342 can store information in the memory cell 300 by causing the storage element 302 to be in a particular state. In the embodiment depicted, each memory cell 300 is a two-terminal device (e.g., the memory cell 300 has two electrodes to receive control signals sufficient to write to and read from the memory cell 300).

In the embodiment depicted, each memory cell (e.g., 300) includes a PM region configured to store information and an SD region 314 (also referred to herein as a select device) coupled to the memory element. The select device may function as a switch (to select the memory cell and may also be used to store information.

Select devices may include ovonic threshold switches, diodes, bipolar junction transistors, field-effect transistors, etc. In one embodiment, the PM region 312 may comprise a first chalcogenide layer and the SD region 314 may comprise a second chalcogenide layer.

The PM region 312 may include any suitable material programmable to a plurality of states. In some embodiments, a region of the PM region 312 may include a chalcogenide material comprising a chemical compound with at least one chalcogen ion, that is, an element from group 16 of the periodic table. For example, the PM region 312 may include one or more of: sulfur(S), selenium (Se), or tellurium (Te). Additionally or alternatively, in various embodiments, storage element 302 may comprise germanium (Ge), antimony (Sb), bismuth (Bi), lead (Pb), tin (Sn), indium (In), silver (Ag), arsenic (As), phosphorus (P), molybdenum (Mo), gallium (Ga), aluminum (Al), oxygen (O), nitrogen (N), chromium (Cr), gold (Au), niobium (Nb), palladium (Pd), cobalt (Co), vanadium (V), nickel (Ni), platinum (Pt), titanium (Ti), tungsten (W), tantalum (Ta), or other materials. In various examples, the PM region 312 may include one or more chalcogenide materials such as such as Te—Se, Ge—Te, In—Se, Sb—Te, Ta—Sb—Te, As—Te, As—Se, Al—Te, As—Se—Te, Ge—Sb—Te, Ge—As—Se, Te—Ge—As, V—Sb—Se, Nb—Sb—Se, In—Sb—Te, In—Se—Te, Te—Sn—Se, V—Sb—Te, Se—Te—Sn, Ge—Se—Ga, Mo—Sb—Se, Cr—Sb—Se, Ta—Sb—Se, Bi—Se—Sb, Mo—Sb—Te, Ge—Bi—Te, W—Sb—Se, Ga—Se—Te, Ge—Te—Se, Cr—Sb—Te, Sn—Sb—Te, W—Sb—Te, As—Sb—Te, Ge—Te—Ti, Te—Ge—Sb—S, Te—Ge—Sn—O, Te—Ge—Sn—Au, Pd—Te—Ge—Sn, In—Se—Ti—Co, Ge—Sb—Te—Pd, Ge—Sb—Te—Co, Sb—Te—Bi—Se, Ag—In—Sb—Te, Ge—Se—Te—In, As—Ge—Sb—Te, Se—As—Ge—In, Ge—Sb—Se—Te, Ge—Sn—Sb—Te, Ge—Te—Sn—Ni, Ge—Te—Sn—Pd, and Ge—Te—Sn—Pt, Si—Ge—As—Se, In—Sn—Sb—Te, Ge—Se—Te—Si, Si—Te—As—Ge, Ag—In—Sb—Te, Ge—Se—Te—In—Si, or Se—As—Ge—Si—In. In other various examples, PM region 312 may include other materials capable of being programmed to one of multiple states, such as Ge—Sb, Ga—Sb, In—Sb, Sn—Sb—Bi, or In—Sb—Ge. One or more elements in a chalcogenide material (or other material used in PM region 312) may be dopants. For example, the storage element 302 may include dopants such as: aluminum (Al), oxygen (O), nitrogen (N), silicon (Si), carbon (C), boron (B), zirconium (Zr), hafnium (Hf), or a combination thereof. In some embodiments, the chalcogenide material (or other material used in storage element 302) may include additional elements such as hydrogen (H), oxygen (O), nitrogen (N), chlorine (Cl), or fluorine (F), each in atomic or molecular forms. The PM region 312 may include other materials or dopants not explicitly listed.

In some embodiments, the select device may also include a chalcogenide material. A select device having a chalcogenide material can sometimes be referred to as an Ovonic Threshold Switch (OTS). An OTS may include a chalcogenide composition including any one of the chalcogenide alloy systems described above for the storage element and may further include an element that can suppress crystallization, such as arsenic (As), nitrogen (N), or carbon (C), to name a few. Examples of OTS materials include Te—As—Ge—Si, Ge—Te—Pb, Ge—Se—Te, Al—As—Te, Se—As—Ge—Si, Se—As—Ge—C, Se—Te—Ge—Si, Ge—Sb—Te—Se, Ge—Bi—Te—Se, Ge—As—Sb—Se, Ge—As—Bi—Te, and Ge—As—Bi—Se, among others.

In some embodiments, an element from column III of the periodic table ("Group III element") may be introduced into a chalcogenide material composition to limit the presence of another material (e.g., Ge) in the select device. For example, a Group III element may replace some or all of the other material (e.g., Ge) in the composition of the select device. In some embodiments, a Group III element may form a stable, Group III element-centered tetrahedral bond structure with other elements (e.g., Se, As, and/or Si). Incorporating a Group III element into the chalcogenide material composition may stabilize the select device to allow for technology scaling and increased cross point technology development (e.g., three-dimensional cross point architectures, RAM deployments, storage deployments, or the like).

In one embodiment, each select device comprises a chalcogenide material having a composition of Se, As, and at least one of B, Al, Ga, In, and Tl. In some cases, the composition of the chalcogenide material comprises Ge or Si, or both.

In one embodiment, programming the memory cell 300 causes the memory cell 300 to "threshold" or undergo a "threshold event." When a memory cell thresholds (e.g., during application of a program pulse), the memory cell undergoes a physical change that causes the memory cell to exhibit a certain threshold voltage in response to the application of a subsequent voltage (e.g., through application of a read pulse). Programming the memory cell 300 can therefore involve applying a program pulse of a given polarity and application of current for a duration of time, which causes the memory cell 300 to exhibit a particular threshold voltage at a subsequent reading voltage.

During a read operation, access circuitry 342 may determine a threshold voltage of a memory cell based on electrical responses to a read voltage applied to the memory cell. Detecting electrical responses can include, for example, detecting a voltage drop (e.g., a threshold voltage) across terminals of a given memory cell of the array or current through the given memory cell. In some cases, detecting a threshold voltage for a memory cell can include determining that the cell's threshold voltage is lower than or higher than a reference voltage, for example a read voltage. The access circuitry 342 can determine the logic state of the memory cell 300 based on the electrical response of the memory cell to the read voltage pulse.

As mentioned above, the access lines 304, 306 electrically couple the memory cell 300 with circuitry 342. The access lines 304, 306 can be referred to as a bitline and wordline, respectively. The wordline is for accessing a particular word in a memory array and the bitline is for accessing a particular bit in the word. The access lines 304, 306 can be composed of one or more metals including: Al, Cu, Ni, Cr, Co, Ru, Rh, Pd, Ag, Pt, Au, Ir, Ta, and W; conductive metal nitrides including TiN, TaN, WN, and TaCN; conductive metal silicides including tantalum silicides, tungsten silicides, nickel silicides, cobalt silicides and titanium silicides; conductive metal silicide nitrides including TiSiN and WSiN; conductive metal carbide nitrides including TiCN and WCN, or any other suitable electrically conductive material.

In one embodiment, electrodes 308 are disposed between storage element 302 and access lines 304, 306. Electrodes 308 electrically couple access lines 304, 306 to storage element 302. Electrodes 308 can be composed of one or more conductive and/or semiconductive materials such as, for example: carbon (C), carbon nitride ($C_xN_y$); n-doped polysilicon and p-doped polysilicon; metals including, Al, Cu, Ni, Mo, Cr, Co, Ru, Rh, Pd, Ag, Pt, Au, Ir, Ta, and W; conductive metal nitrides including TiN, TaN, WN, and TaCN; conductive metal silicides including tantalum silicides, tungsten silicides, nickel silicides, cobalt silicides and titanium silicides; conductive metal silicides nitrides including TiSiN and WSiN; conductive metal carbide nitrides including TiCN and WCN; conductive metal oxides including $RuO_2$, or other suitable conductive materials. In one embodiment, conductive wordline layer can include any suitable metal including, for example, metals including, Al, Cu, Ni, Mo, Cr, Co, Ru, Rh, Pd, Ag, Pt, Au, Ir, Ta, and W; conductive metal nitrides including TiN, TaN, WN, and TaCN; conductive metal silicides including tantalum silicides, tungsten silicides, nickel silicides, cobalt silicides and titanium silicides; conductive metal silicides nitrides including TiSiN and WSiN; conductive metal carbide nitrides including TiCN and WCN, or another suitable electrically conductive material.

The memory cell 300 is one example of a memory cell that may be used to store one or more logical bits. Other embodiments can include memory cells having additional or different layers of material than illustrated in FIG. 3.

Figure 4:
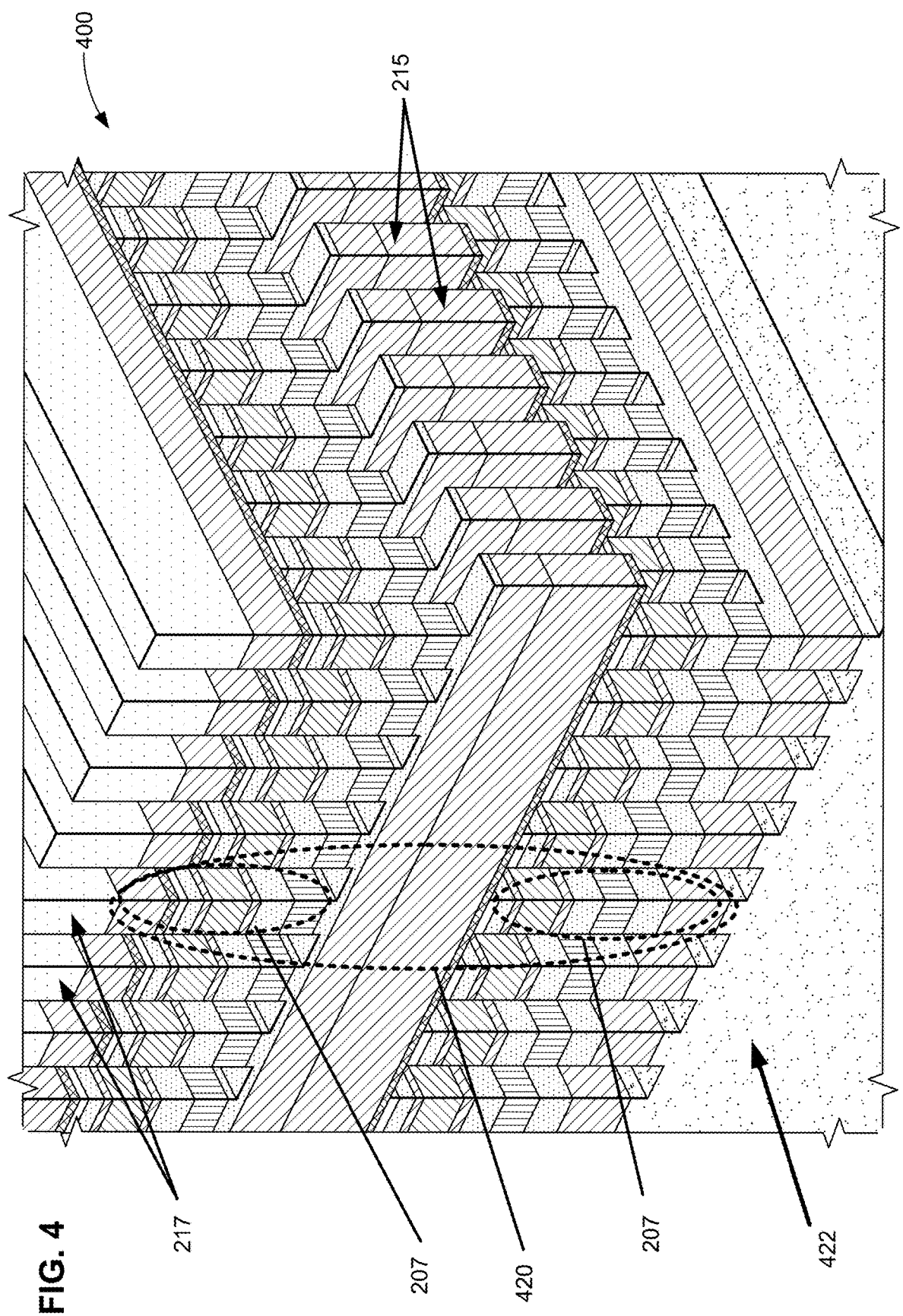
FIG. 4 is a perspective view of portions of a three dimensional (3D) crosspoint memory stack in accordance with certain embodiments.

FIG. 4 is a perspective view of portions of a 3D crosspoint memory stack according to one embodiment. The specific layers are merely examples and will not be described in detail here. Stack 400 is built on substrate structure 422, such as silicon or other semiconductor. Stack 400 includes multiple pillars 420 as memory cell stacks of memory cells 207 or 300. In the diagram of stack 400, it will be observed that the WLs and BLs are orthogonal to each other, and traverse or cross each other in a cross-hatch pattern. A crosspoint memory structure includes at least one memory cell in a stack between layers of BL and WL. As illustrated, wordlines (WL) 215 are in between layers of elements, and bitlines (BL) 217 are located at the top of the circuit. Such a configuration is only an example, and the BL and WL structure can be swapped. Thus, in one representation of stack 400, the WLs can be the metal structures labeled as 217, and the BLs can be the metal structures labeled as 215. Different architectures can use different numbers of stacks of devices, and different configuration of WLs and BLs. It will be understood that the space between pillars 420 is typically an insulator.

Substrate structure 422, such as a silicon substrate, may include control circuitry therein (not shown), such as control circuitry including transistors, row decoders, page buffers, etc. The control circuitry of substrate structure 422 may include, for example, a memory partition controller such as memory partition controller 210, BL control logic such as BL control logic 216, and WL control logic such as WL control logic 214 of FIG. 2, access circuitry 342, or other suitable control circuitry. Each row of WLs 215 extending in the Y direction, the corresponding cells as coupled to corresponding BLs, would define a memory array, and may correspond to a memory array such as memory array 206 of FIG. 2.

Figure 5:
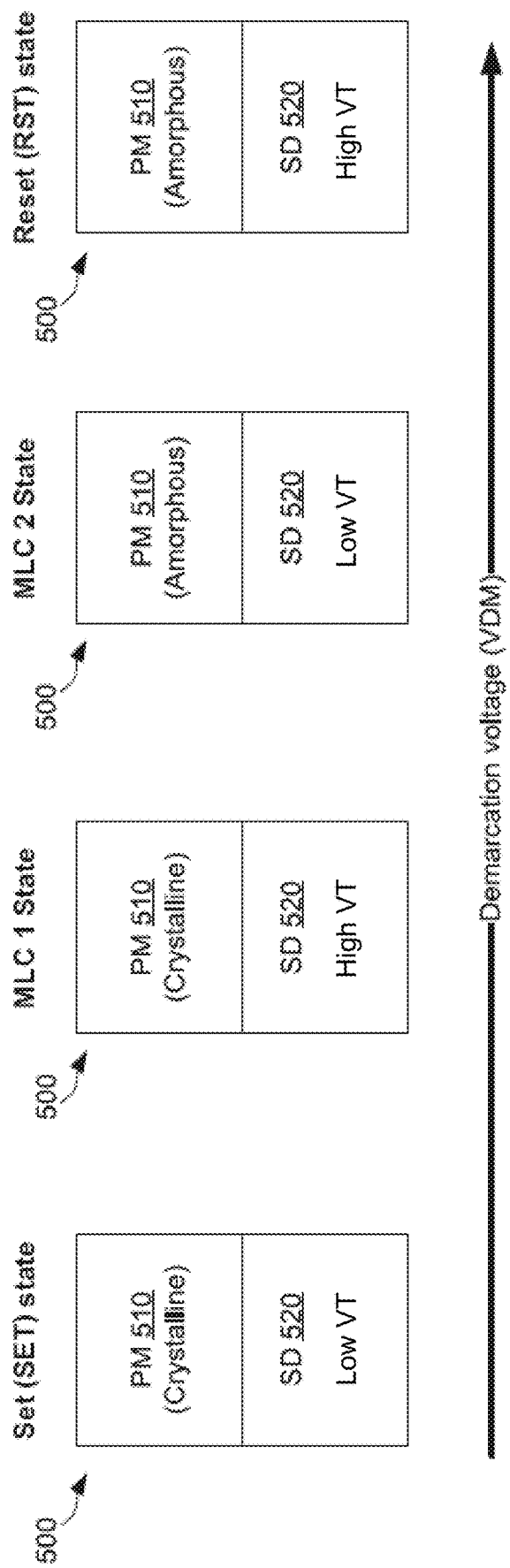
FIG. 5 illustrates example memory states of a memory cell in accordance with embodiments of the present disclosure.

FIG. 5 illustrates example memory states of a memory cell 500 in accordance with embodiments of the present disclosure. Memory cell 500 may represent any of the other memory cells disclosed herein. As shown, a first state (referred to herein as a SET state) may be defined by a low VT state in the SD region 520 of the cell 500 and a crystalline state in the PM region 510 of the cell 500. A second state (referred to herein as an MLC1 state) may be defined by a high VT state in the SD region 520 of the cell 500 and a crystalline state in the PM region 510 of the cell 500. A third state (referred to herein as an MLC2 state) may be defined by a low VT state in the SD region 520 of the cell 500 as in the first state, but with an amorphous state in the PM region 510 of the cell 500. Finally, a fourth state (referred to herein as a reset (RST) state) may be defined by a high VT state in the SD region 520 of the cell 500 like the second state, but with an amorphous state in the PM region 510 of the cell 500.

To achieve each of these states, certain currents may be applied to the memory cell 500 in a particular amount and duration, which may be based on the properties of the PM and/or SD region materials, the size of the memory cell, or other factors. Examples processes for programming each of the four states are described in U.S. patent application Ser.

No. 17/408,352, entitled "Encoding Additional States in a Three-Dimensional Crosspoint Memory Architecture", and filed Aug. 20, 2021.

In a read operation, the demarcation voltage (VDM) of the cell in the SET state may be the lowest of the four states, and the VDM of the cell in the RST state may be the highest of the four states. The VDM of the MLC1 and MLC2 states may be between these two states, with the VDM of the MLC1 being closer to the VDM of the SET state and the VDM of the MLC2 being closer to the VDM of the RST state.

During a reading of the memory cell, the memory cell may "snap" once the differential voltage between the address lines reaches a particular voltage (referred to as the threshold voltage or VDM) and the snap is detected. Prior to the snap, a significant amount of current does not flow in the cell; however, once the differential voltage reaches the threshold/demarcation voltage, current begins to flow in the cell, causing a drop in the differential voltage between the two address lines.

A state of the memory cell may be determined based on the differential voltage across the two address lines at the time of the cell snapping. As described above, the SET state may have a lower demarcation voltage than the MLC1 state. In some cases, each state may have a range of demarcation voltages at which the state is indicated.

In some embodiments, in the SET state the PM region 510 is in a fully crystalline state and the SD region 520 is in a lower resistance amorphous state (also referred to herein as a low threshold voltage state), in the MLC 1 state the PM region 510 is in a fully crystalline state and the SD region 520 is in a higher resistance amorphous state (also referred to herein as a high threshold voltage state), in the MLC 2 state the PM region 510 is in a fully amorphous state and the SD region 520 is in a lower resistance amorphous state (low threshold voltage state), and in the RST state the PM region 510 is in a fully amorphous state and the SD region 520 is in a higher resistance amorphous state (high threshold voltage state). In various embodiments, a crystalline state may include an array of highly organized atoms/molecules whereas an amorphous state may include an array with disorganized atoms/molecules, with various degrees of disorganization resulting in various degrees of amorphousness with varying degrees of resistance (and resulting VTs).

When a cell is programmed, e.g., from a SET to a RST state, the PM region 510 may change, e.g., from a substantially crystalline state to a substantially amorphous state. This results in its resistance (and consequently its VT) to increase significantly (~1 volt in an illustrative example). The SD region 520 may also go through a partial phase change (e.g., from a less amorphous state to a more amorphous state in which the resistance and VT is increased, e.g., by ~0.3 V in an illustrative example). Using this illustrative example, if the VDM for the SET state=V0, then VDM of MLC 1 state=V0+0.3, VDM of MLC 2 state=V0+1 V, and VDM of RST state=V0+1.3 V. Other embodiments contemplate other differences between the VDMs of the various states (e.g., the transition of the PM region from a crystalline state to an amorphous state could result in a change of the VT of the cell of more or less than 1 V and the transition of the SD region from a low VT state to a high VT state could result in a change of the VT of the cell of more or less than 0.3 V).

Figure 6:
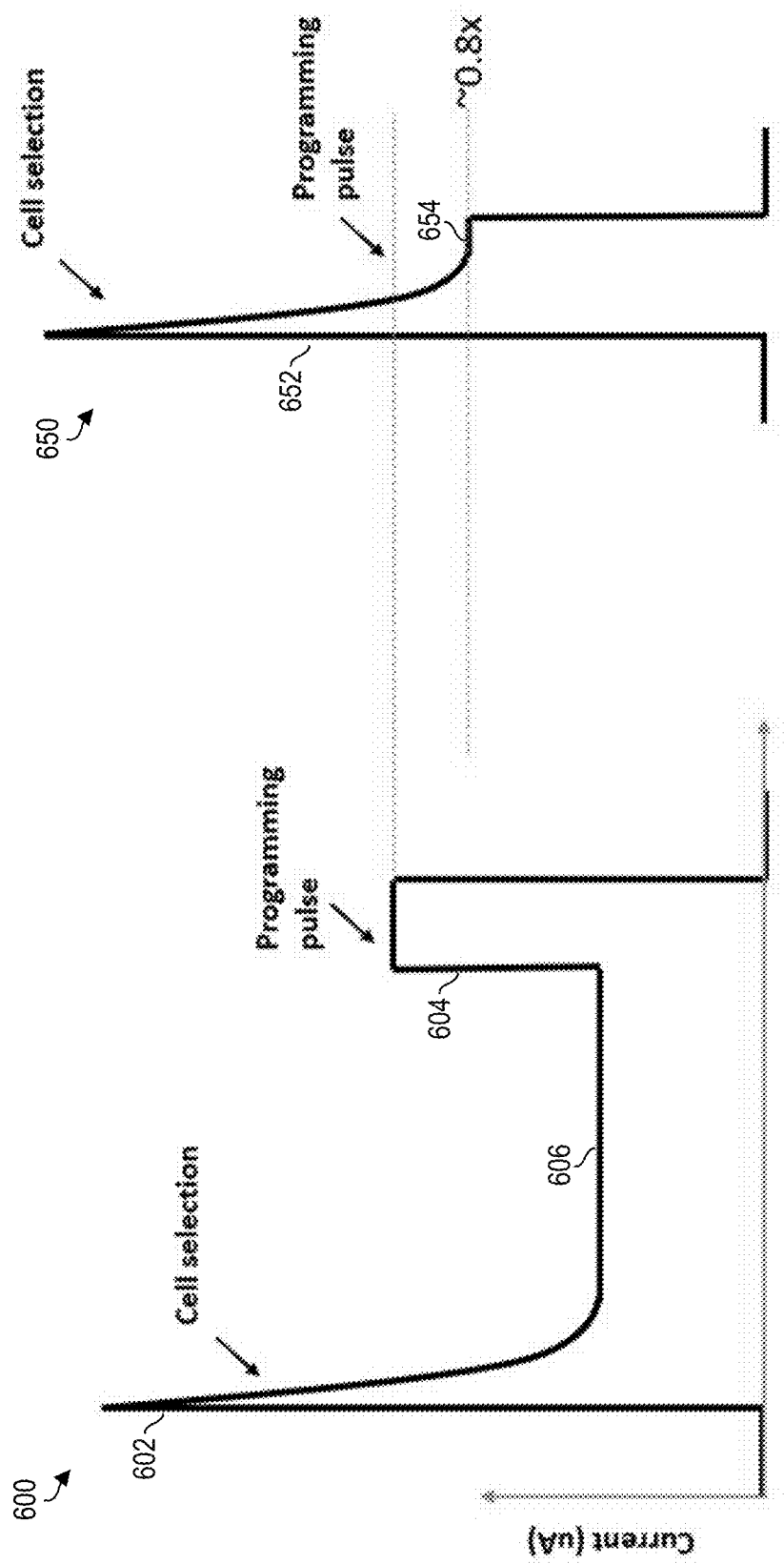
FIGS. 6A and 6B illustrate current waveforms for programming a memory cell to a reset state in accordance with certain embodiments.

FIGS. 6A-6B illustrate example current waveforms 600, 650 that may place a memory cell (e.g., 500) of the present disclosure into a RST state. The RST state may be represented by an amorphous state in the PM region 510 of the memory cell and a high VT state in the SD region 520 of the memory cell. In the examples shown, the currents may be applied to the memory cell 500, which includes the PM region 510 and SD region 520 in series with one another.

FIG. 6A illustrates a waveform 600 for programming a memory cell to a RST state in accordance with certain embodiments. This waveform 600 includes a relatively high amplitude programming pulse 604 applied after the cell is selected via a spike 602 and the current has settled to a relatively low amplitude (lower than the spike 602 and the programming pulse 604) during the time period 606 between the settlement of the spike and the programming pulse. In some implementations, the amplitude of the programming pulse 604 may be roughly equal to $I_{melt}$ (the current that if continuously applied will cause the PM region 510 to melt). In one embodiment, the amplitude of the programming pulse 604 may be about 100 uA and have a duration of roughly 10 ns. In this embodiment, the amplitude of the spike 602 may be limited by a spike mitigation device (e.g., 230, 316).

FIG. 6B illustrates a waveform 650 for programming a memory cell to a RST state using spike-based programming in accordance with certain embodiments. In this embodiment, the spike 652 used to select the memory cell has a higher amplitude than in the waveform 600 and initiates the programming process of the memory cell into the RST state by, e.g., beginning the change of a crystalline state (of the PM region 510) to an amorphous state.

The increased spike amplitude of the waveform 650 enables the programming pulse 654 to have a relatively low amplitude and a shorter duration than the programming pulse 604. The time period 606 between the settlement of the spike and the application of the programming pulse may also be omitted (and the spike may settle directly to the amplitude of the programming pulse 654, e.g., without dipping below the amplitude of the programming pulse 654 first).

The amplitude of the spike 652 may be increased relative to the amplitude of spike 602 by loosening the spike mitigation restrictions on the spike mitigation device (e.g., 230, 316). An example configuration for the spike mitigation device is described below.

In some embodiments, the programming pulse has an amplitude below $I_{melt}$. For example, in the embodiment depicted, the programming pulse has an amplitude of approximately $0.8 \times I_{melt}$. In another embodiment, the programming pulse has an amplitude of approximately $0.86 \times I_{melt}$. In other embodiments, the programming pulse may have an amplitude of between $0.7$-$0.98 \times I_{melt}$ or other suitable amplitude.

While example current and duration values are shown in FIGS. 6A-6B, it should be understood that the current and duration values may be different for different memory cells, as such values may be based on the size, material, etc. of the SD and/or PM regions of the memory cell. For example, the current values shown in FIGS. 6A-6B may decrease from those shown for smaller memory cell sizes. However, in various embodiments, the relative ranges and behaviors may remain similar to those shown in FIGS. 6A-6B.

Figure 7:
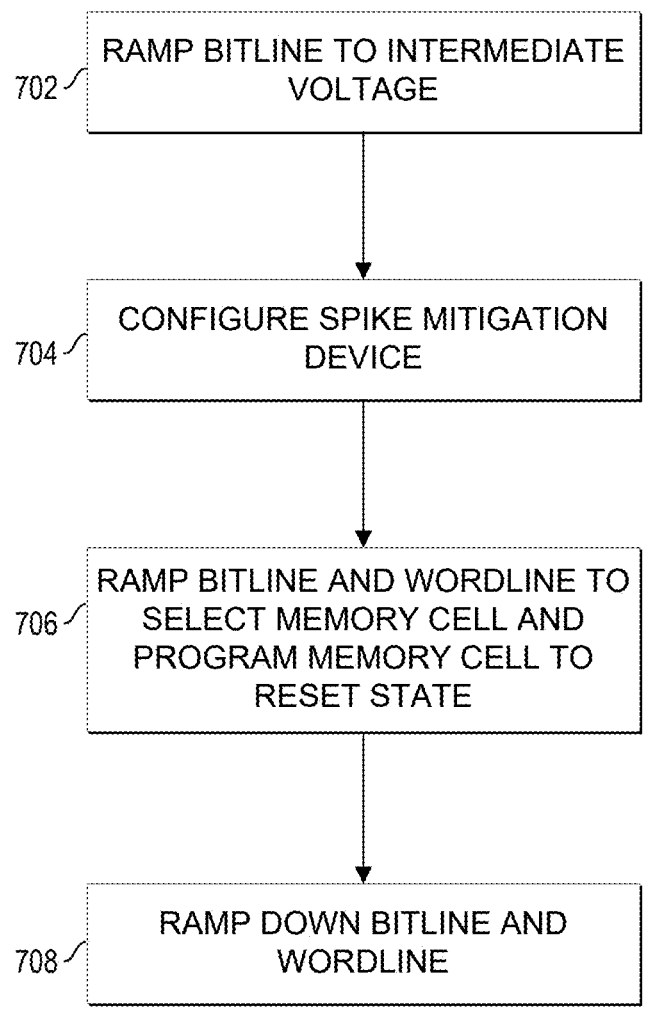
FIG. 7 illustrates a flow for spike-based programming of a memory cell to a reset state in accordance with certain embodiments.

FIG. 7 illustrates a flow for spike-based programming of a memory cell to a RST state in accordance with certain embodiments. The flow may be used to generate the waveform 650 (or other waveform compatible with any of the various embodiments described herein) and apply the waveform to a memory cell to program the memory cell to the RST state.

At 702, a bitline coupled to the target memory cell is ramped to an intermediate voltage. For example, the bitline may be ramped from an initial voltage (e.g., a deselect bias voltage such as ground) to a voltage that is between the initial voltage and the voltage the bitline will be coupled to during the programming of the memory cell (e.g., a bitline programming voltage). In at least some embodiments, this ramping will not result in selection of the memory cell. As the bitline is being ramped to this intermediate voltage, the wordline coupled to the target memory cell may remain off (e.g., held at an deselect bias voltage such as ground). Such an implementation may be different from other programming processes in which the bitline and wordline are ramped together to their respective programming voltages to initiate the programming of the memory cell.

The ramping of the bitline to the intermediate voltage may result in a stable bias on the bitline before the bias on the wordline is changed. The intermediate voltage may be selected so as to achieve an appropriate change in voltage (dV/dt) across the memory cell during the selection of the memory cell (e.g., when the bitline and wordline are both ramped to respective programming voltages), as this significantly impacts the behavior of the phase change material. Thus, the intermediate voltage may be engineered to ensure that the amplitude of the spike 652 is high enough without being too high (as higher amplitude spikes may negatively affect the longevity of the memory cell).

In some embodiments, the intermediate voltage applied to the bitline may be in a range between 3-3.5 V or other suitable value depending on the implementation. In particular embodiments, the intermediate voltage may be a regulated gate bias. In various examples, the current (e.g., through a voltage regulator supplying the bias) resulting from the intermediate voltage may be between 20-35 uA, such as approximately 27 uA. In other examples, any suitable current may result from the application of the intermediate voltage. The time duration over which the intermediate voltage is applied before proceeding with the operation (e.g., before moving to 704 or 706) may be any suitable length such as between 3 to 10 ns (in one example, it may be approximately 5 ns). A shorter duration is generally preferable, but the duration may be long enough to achieve a stable bias of the bitline.

At 704, a spike mitigation device (e.g., 230) is configured. The spike mitigation device may generally be used during a read or write operation to choke off spike currents, but in this instance a relatively large spike current is desired during programming so the constraints on the spike mitigation device may be loosened. For example, when the spike is to be limited to a lower value, a gate of a transistor implementing the spike mitigation device may be biased such that the gate to source voltage of the transistor is approximately 1 to 1.5 V. However, if the spike is to be larger (e.g., as illustrated in waveform 650), the gate to source voltage of the transistor may be biased to a larger value (e.g., approximately 1.8 to 2 V). In some embodiments, at 704 the gate to source voltage of the transistor may be set to a bias level that has an amplitude greater than the gate to source voltage bias applied to the transistor during a read operation (e.g., 1 to 1.2 V). In various embodiments, at 704 the gate to source voltage of the transistor is set to a bias level that is different from (e.g., having an amplitude higher than) a bias level (e.g., approximately 1.5 V) applied to the gate to source voltage of the transistor when a write operation is performed to program the memory cell to a state other than RST. In one embodiment, the voltage that is applied to the gate of the transistor at 704 is approximately −1.35 V.

The time duration over which the bias for the spike mitigation device is applied may be any suitable length such as between 3 to 10 ns. In one example, the length may be approximately 5 ns. A shorter duration is generally preferable, but the duration may be long enough to achieve a stable bias for the spike mitigation device.

At 706, the bitline and wordline are ramped together to respective programming voltages to select the memory cell and to program the memory cell to the reset state. The ramping of the bitline and wordline result in selection of the memory cell (causing the cell to snap) as well as application of a large spike current (e.g., 652) which eventually settles to the level of the programming pulse (e.g., 654). In one embodiment, the bitline is ramped to a bitline programming voltage (e.g., approximately 4.3 V or other suitable value) that has a higher amplitude than the intermediate voltage and the wordline is concurrently ramped to a wordline programming voltage (e.g., to approximately −4.5 V or other suitable value). In various embodiments, concurrent with such ramping, the bias applied to the spike mitigation device is set to a different value (e.g., ground).

In some embodiments, the current applied to the cell during the resulting spike 652 is larger than $I_{melt}$ (e.g., 1.2 to 2.0×$I_{melt}$), while the current applied during the program pulse 654 after the spike may drop to between 0.75-0.95× $I_{melt}$ (e.g., in one embodiment the current may be approximately 87 uA when $I_{melt}$ is approximately 100 uA). However, other suitable current amplitudes of the programming pulse 654 are contemplated herein. In some embodiments, the current may reach these levels after approximately 3 to 4 ns after selection of the memory cell.

The current of the programming pulse (e.g., 654) may continue to be applied for a relatively short duration (TON), such as between 0.5 and 5 ns (or other suitable length of time). In one example, TON is between 1 and 2 ns. After selection of the memory cell, the current that passes through the memory cell may change the state of the memory cell to the RST state within a relatively short period of time, such as approximately 5 ns.

At 708, shutdown is performed by ramping down the bitline and the wordline (e.g., to ground or other voltage(s) used when a cell is not to be selected). The bias applied to the spike mitigation device may also be set to a suitable voltage. The shutdown may be performed in a manner so as to cut off the current through the memory cell relatively quickly in order to ensure that the SD region achieves a high VT state by remaining in an amorphous state with high resistivity.

Figure 8:
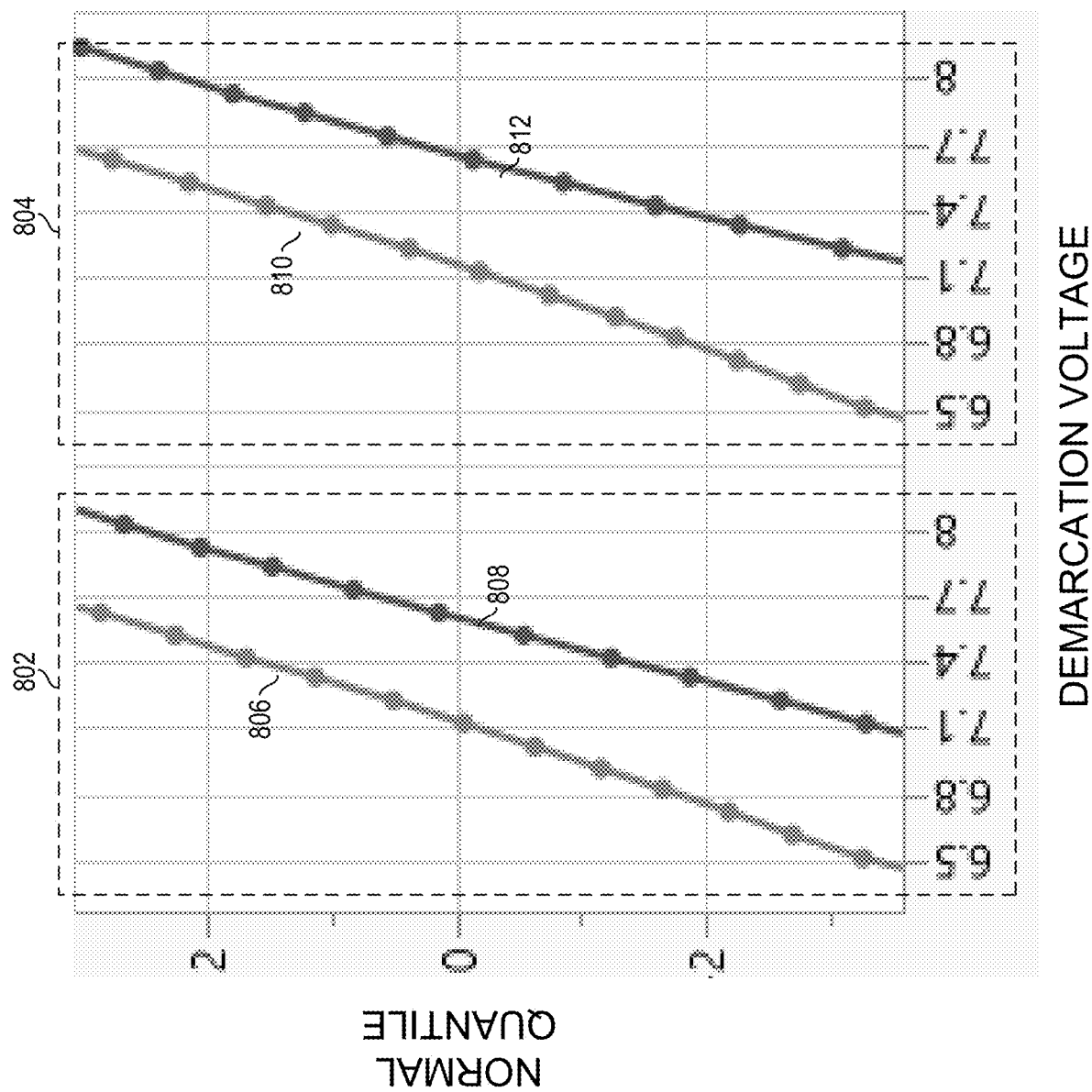
FIG. 8 illustrates threshold voltage distributions of memory cells programmed according to the waveforms of FIGS. 6A and 6B.

FIG. 8 illustrates VDM distributions of example memory cells programmed based on to the waveforms of FIGS. 6A and 6B. In this FIG., the x-axis is the VDM of the various memory cells and the y-axis represents the normal quantile (e.g., an indication of the number of cells having a particular VDM, where 0 is the median of the distribution and each unit represents one sigma from the median).

In this distribution, data sets 806 and 810 represent memory cells programmed to the MLC2 state and data sets 808 and 812 represent those same memory cells subsequently programmed to the RST state.

Data sets 806 and 810 represent the same set of memory cells programmed to MLC2 state (i.e., these are the same data set). Data set 808 represents those memory cells after being programmed from the MLC2 state to the RST state using a programming waveform similar to waveform 600 (in which a relatively long and high amplitude programming pulse is applied after a spike with relatively low amplitude). Data set 812 represents the memory cells after being programmed from the MLC2 state to the RST state using a programming waveform similar to waveform 650 (in which a larger spike and shorter, lower amplitude programming pulse is applied). As depicted, the VDMs of data sets 808 and 812 align fairly closely, showing that the programming embodiment corresponding to waveform 650 is very similar in effectiveness in achieving the RST state as the programming embodiment corresponding to waveform 600.

The flows described in the FIGs. are merely representative of operations that may occur in particular embodiments. Some of the operations illustrated in the FIGs. may be repeated, combined, modified, or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable storage medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as CPU 102, external I/O controller 104, processor 108, cores 114A and 114B, I/O controller 110, CPU memory controller 112, storage device 106, system memory device 107, memory chip 116, storage device controller 118, address translation engine 120, memory partition 122, program control logic 124, chip controller 126, memory partition controller 210, wordline control logic 214, bitline control logic 216, WL switch circuitry 220, BL switch circuitry 224, access circuitry 342, or other entity or component described herein, or subcomponents of any of these. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, e.g. reset, while an updated value potentially includes a low logical value, e.g. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (e.g., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a The machine-readable storage medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage medium used in the transmission of information over the Internet via electrical, optical, acoustical or other forms of propagated signals (e.g., carrier waves, infrared signals, digital signals, etc.). Accordingly, the computer-readable medium includes any type of tangible machine-readable storage medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes a memory device comprising a plurality of memory cells, a memory cell of the plurality of memory cells comprising a phase change material (PM) region and a select device (SD) region in series with the PM region; a first address line and a second address line coupled to the memory cell; and memory controller circuitry to interface with the first address line and the second address line, the memory controller circuitry to encode a state in a memory cell by applying, through the first address line and second address line, a current spike and a programming pulse to the memory cell to cause the PM region to be placed into an amorphous state and the SD region of the memory cell to be placed into a high threshold voltage state.

Example 2 includes the subject matter of Example 1, and wherein applying the current spike and the programming pulse comprises coupling the first address line to an intermediate programming voltage and subsequently ramping the first address line and second address line concurrently to respective programming voltages.

Example 3 includes the subject matter of any of Examples 1 and 2, and wherein applying the current spike and the programming pulse further comprises biasing a gate of a transistor to a first voltage level, wherein the transistor is to provide mitigation of the current spike.

Example 4 includes the subject matter of any of Examples 1-3, and wherein applying the current spike and the programming pulse further comprises ramping the gate of the transistor to a second voltage level concurrently with the ramping of the first address line and the second address line to the respective programming voltages.

Example 5 includes the subject matter of any of Examples 1-4, and wherein an amplitude of the current spike is greater than a melting current of the PM region and an amplitude of the programming pulse is less than the melting current.

Example 6 includes the subject matter of any of Examples 1-5, and wherein a combined duration of the current spike and the programming pulse is less than 10 nanoseconds.

Example 7 includes the subject matter of any of Examples 1-6, and wherein the programming pulse has an amplitude between 70% and 95% of an amplitude of a melting current of the PM region.

Example 8 includes the subject matter of any of Examples 1-7, and wherein the plurality of memory cells are arranged in a three dimensional crosspoint memory array.

Example 9 includes the subject matter of any of Examples 1-8, and further including a plurality of memory chips, wherein a first memory chip of the plurality of memory chips comprises the three dimensional crosspoint memory array and the memory controller circuitry.

Example 10 includes the subject matter of any of Examples 1-9, and further including a memory controller to communicate with the plurality of memory chips.

Example 11 includes the subject matter of any of Examples 1-10, and wherein the memory device comprises a solid state drive.

Example 12 includes the subject matter of any of Examples 1-11, and wherein the memory device comprises a dual in-line memory module.

Example 13 includes a method comprising encoding a state in a memory cell by applying, through a first address line and a second address line coupled to a memory cell, a current spike and a programming pulse to a memory cell to cause a phase change material (PM) region of the memory cell to be placed into an amorphous state and a select device (SD) region of the memory cell to be placed into a high threshold voltage state, wherein the PM region is in series with the SD region.

Example 14 includes the subject matter of Example 13, and wherein applying the current spike and the programming pulse comprises coupling the first address line to an intermediate programming voltage and subsequently ramping the first address line and second address line concurrently to respective programming voltages.

Example 15 includes the subject matter of any of Examples 13 and 14, and wherein applying the current spike and the programming pulse further comprises biasing a gate of a transistor to a first voltage level, wherein the transistor is to provide mitigation of the current spike.

Example 16 includes the subject matter of any of Examples 13-15, and wherein applying the current spike and the programming pulse further comprises ramping the gate of the transistor to a second voltage level concurrently with the ramping of the first address line and the second address line to the respective programming voltages.

Example 17 includes the subject matter of any of Examples 13-16, and wherein an amplitude of the current spike is greater than a melting current of the PM region and an amplitude of the programming pulse is less than the melting current.

Example 18 includes the subject matter of any of Examples 13-17, and wherein a combined duration of the current spike and the programming pulse is less than 10 nanoseconds.

Example 19 includes the subject matter of any of Examples 13-18, and wherein the programming pulse has an amplitude between 70% and 95% of an amplitude of a melting current of the PM region.

Example 20 includes the subject matter of any of Examples 13-19, wherein the plurality of memory cells are arranged in a three dimensional crosspoint memory array.

Example 21 includes a system comprising a storage device controller; and at least one memory chip coupled to the storage device controller, wherein a memory chip comprises a three dimensional crosspoint memory array comprising a plurality of memory cells, a memory cell of the plurality of memory cells comprising a phase change material (PM) region and a select device (SD) region in series with the PM region; and a first address line and a second address line coupled to the memory cell; and memory controller circuitry to interface with the first address line and the second address line, the memory controller circuitry to encode a state in a memory cell by applying, through the first address line and second address line, a current spike and a programming pulse to the memory cell to cause the PM region to be placed into an amorphous state and the SD region of the memory cell to be placed into a high threshold voltage state.

Example 22 includes the subject matter of Example 21, and further including a processor to generate data to be stored by the three dimensional crosspoint memory array, the processor to couple to the at least one memory chip through the storage device controller.

Example 23 includes the subject matter of any of Examples 21 and 22, and further including one or more of a battery communicatively coupled to the processor, a display communicatively coupled to the processor, or a network interface communicatively coupled to the processor.

Example 24 includes the subject matter of any of Examples 21-23, and wherein applying the current spike and the programming pulse comprises coupling the first address line to an intermediate programming voltage and subsequently ramping the first address line and second address line concurrently to respective programming voltages.

Example 25 includes the subject matter of any of Examples 21-24, and wherein applying the current spike and the programming pulse further comprises biasing a gate of a transistor to a first voltage level, wherein the transistor is to provide mitigation of the current spike.

Example 26 includes the subject matter of any of Examples 21-25, and wherein applying the current spike and the programming pulse further comprises ramping the gate of the transistor to a second voltage level concurrently with the ramping of the first address line and the second address line to the respective programming voltages.

Example 27 includes the subject matter of any of Examples 21-26, and wherein an amplitude of the current spike is greater than a melting current of the PM region and an amplitude of the programming pulse is less than the melting current.

Example 28 includes the subject matter of any of Examples 21-27, and wherein a combined duration of the current spike and the programming pulse is less than 10 nanoseconds.

Example 29 includes the subject matter of any of Examples 21-28, and wherein the programming pulse has an amplitude between 70% and 95% of an amplitude of a melting current of the PM region.

Example 30 includes the subject matter of any of Examples 21-29, and wherein the plurality of memory cells are arranged in a three dimensional crosspoint memory array.

Example 31 includes the subject matter of any of Examples 21-30, and further including a plurality of memory chips, wherein a first memory chip of the plurality of memory chips comprises the three dimensional crosspoint memory array and the memory controller circuitry.

Example 32 includes the subject matter of any of Examples 21-31, and further including a memory controller to communicate with the plurality of memory chips.

Example 33 includes the subject matter of any of Examples 21-32, and wherein the memory device comprises a solid state drive.

Example 34 includes the subject matter of any of Examples 21-33, and wherein the memory device comprises a dual in-line memory module.

What is claimed is:

1. A memory device comprising:
    a plurality of memory cells, a memory cell of the plurality of memory cells comprising a phase change material (PM) region and a select device (SD) region in series with the PM region;
    a first address line and a second address line coupled to the memory cell; and
    memory controller circuitry to interface with the first address line and the second address line, the memory controller circuitry to encode a state in the memory cell by applying, through the first address line and second address line, a current spike and a programming pulse to the memory cell to cause the PM region to be placed into an amorphous state and the SD region of the memory cell to be placed into a high threshold voltage state, wherein an amplitude of the current spike is greater than a melting current of the PM region and an amplitude of the programming pulse is less than the melting current.

2. The memory device of claim 1, wherein applying the current spike and the programming pulse comprises coupling the first address line to an intermediate programming voltage and subsequently ramping the first address line and second address line concurrently to respective programming voltages.

3. The memory device of claim 2, wherein applying the current spike and the programming pulse further comprises biasing a gate of a transistor to a first voltage level, wherein the transistor is to provide mitigation of the current spike.

4. The memory device of claim 3, wherein applying the current spike and the programming pulse further comprises ramping the gate of the transistor to a second voltage level concurrently with the ramping of the first address line and the second address line to the respective programming voltages.

5. The memory device of claim 1, wherein an amplitude of the current spike is greater than a melting current of the PM region and an amplitude of the programming pulse is less than the melting current.

6. The memory device of claim 1, wherein a combined duration of the current spike and the programming pulse is less than 10 nanoseconds.

7. The memory device of claim 1, wherein the programming pulse has an amplitude between 70% and 95% of an amplitude of a melting current of the PM region.

8. The memory device of claim 1, wherein the plurality of memory cells are arranged in a three dimensional crosspoint memory array.

9. The memory device of claim 8, further comprising a plurality of memory chips, wherein a first memory chip of the plurality of memory chips comprises the three dimensional crosspoint memory array and the memory controller circuitry.

10. The memory device of claim 9, further comprising a memory controller to communicate with the plurality of memory chips.

11. The memory device of claim 1, wherein the memory device comprises a solid state drive.

12. The memory device of claim 1, wherein the memory device comprises a dual in-line memory module.

13. A method comprising:
    encoding a state in a memory cell by applying, through a first address line and a second address line coupled to a memory cell, a current spike and a programming pulse to the memory cell to cause a phase change material (PM) region of the memory cell to be placed into an amorphous state and a select device (SD) region of the memory cell to be placed into a high threshold voltage state, wherein the PM region is in series with the SD region, wherein a combined duration of the current spike and the programming pulse is less than 10 nanoseconds.

14. The method of claim 13, wherein applying the current spike and the programming pulse comprises coupling the first address line to an intermediate programming voltage and subsequently ramping the first address line and second address line concurrently to respective programming voltages.

15. The method of claim 13, wherein an amplitude of the current spike is greater than a melting current of the PM region and an amplitude of the programming pulse is less than the melting current.

16. The method of claim 13, wherein a combined duration of the current spike and the programming pulse is less than 10 nanoseconds.

17. A system comprising:
    a storage device controller; and
    at least one memory chip coupled to the storage device controller, wherein a memory chip comprises:
        a three dimensional crosspoint memory array comprising:
        a plurality of memory cells, a memory cell of the plurality of memory cells comprising a phase change material (PM) region and a select device (SD) region in series with the PM region; and
        a first address line and a second address line coupled to the memory cell; and
        memory controller circuitry to interface with the first address line and the second address line, the memory controller circuitry to encode a state in the memory cell by applying, through the first address line and second address line, a current spike and a programming pulse to the memory cell to cause the PM region to be placed into an amorphous state and the SD region of the memory cell to be placed into a high threshold voltage state, wherein the programming pulse has an amplitude between 70% and 95% of an amplitude of a melting current of the PM region.

18. The system of claim 17, further comprising a processor to generate data to be stored by the three dimensional crosspoint memory array, the processor to couple to the at least one memory chip through the storage device controller.

19. The system of claim 18, further comprising one or more of: a battery communicatively coupled to the processor, a display communicatively coupled to the processor, or a network interface communicatively coupled to the processor.

20. The system of claim 17, wherein applying the current spike and the programming pulse comprises coupling the first address line to an intermediate programming voltage and subsequently ramping the first address line and second address line concurrently to respective programming voltages.

* * * * *